United States Patent [19]
Mortensen

[11] 3,819,014
[45] June 25, 1974

[54] BUFFER ARRANGEMENT
[75] Inventor: Kjell Sverre Mortensen, Raadal, Norway
[73] Assignee: Sverre Munck A/S, Bergen, Norway
[22] Filed: Dec. 11, 1972
[21] Appl. No.: 313,628

[30] Foreign Application Priority Data
Dec. 9, 1971 Norway.............................. 4542/71

[52] U.S. Cl................................................ 188/1 B
[51] Int. Cl................................................ F16f 7/08
[58] Field of Search ........................... 188/1 B, 271

[56] References Cited
UNITED STATES PATENTS
| | | | |
|---|---|---|---|
| 1,763,064 | 6/1930 | Paton et al................... | 188/1 B UX |
| 1,819,665 | 8/1931 | Wiltse................................ | 188/1 B |
| 2,151,280 | 3/1939 | Rouy................................... | 188/1 B |
| 2,494,985 | 1/1950 | Campbell......................... | 188/1 B X |
| 3,172,502 | 3/1965 | Wells.................................. | 188/1 B |
| 3,666,057 | 5/1972 | Leifer et al.......................... | 188/1 B |

*Primary Examiner*—Duane A. Reger
*Attorney, Agent, or Firm*—Larson, Taylor and Hinds

[57] ABSTRACT

A buffer for a pipe comprising two friction members secured to a mounting plate, the pipe passing through the friction members. The members are urged towards each other by an adjustable spring force. Rubber impact stoppers are on the ends of the pipe.

2 Claims, 2 Drawing Figures

PATENTED JUN 25 1974 3,819,014

BUFFER ARRANGEMENT

The present invention relates to a buffer arrangement for absorbing and by the aid of friction retarding the live force of a linearly moving body.

The invention is preferably intended for use in automatic cranes but it may of course be utilized to retard any linearly moving mass.

The object of the arrangement according to the invention is to provide constant retardation along the entire length of the buffer so as to reduce the strain on the crane structure or the like to a minimum. This is achieved by use of friction buffers according to the invention, since these as distinct from most other kinds of buffers do not result in an increasing braking force towards the end of the buffer length with an increasing retardation and strain as a consequence.

According to the invention the buffer arrangement thus comprises one or several friction members provided with means to be secured to said body, each of which friction members consists of clamping jaws being wedged towards each other by spring means the spring force of which may be adjusted by suitable means e.g. screws, each of said clamping jaws being shaped in such a manner that an opening is formed between them, adapted for the passage of an elongated sylindrical element, one or both ends of which are arranged to contact and retard the mentioned force.

For better understanding of the invention it shall now be described in detail with reference to an embodiment diagrammatically shown in the accompanying drawing.

Figure 1:
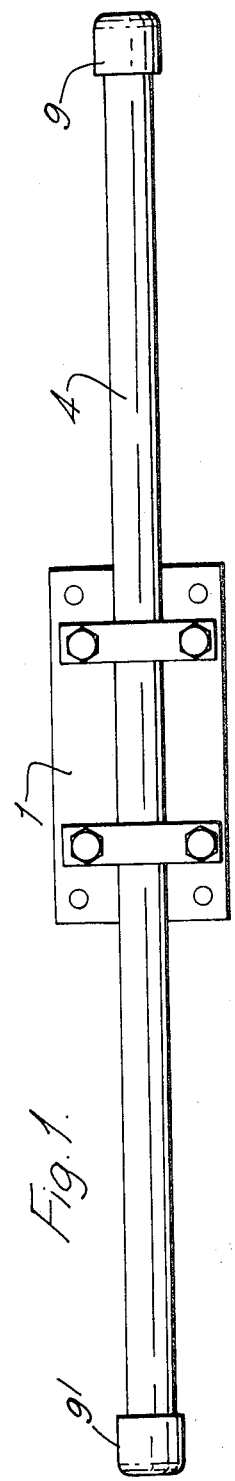
FIG. 1 is an elevational view of the buffer.
Figure 2:
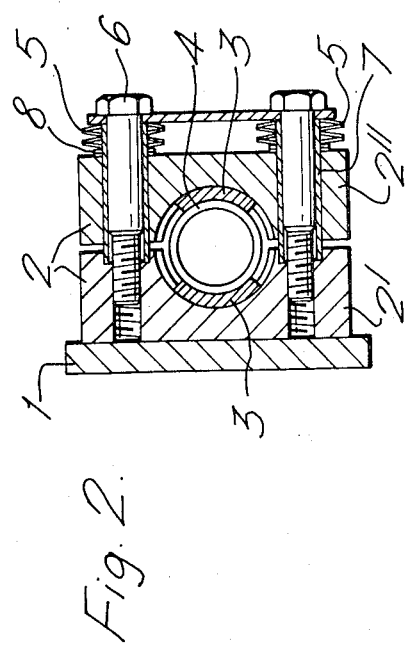
FIG. 2 is a sectional view through one of the friction members.

The buffer arrangement according to the example shown comprises two friction members 2, secured to a mounting plate 1, which in turn may be secured e.g. to a crane. Through the two friction members 2 a rod or a pipe 4 is passing and is provided with a rubber stopper 9 in one or both ends for impact against suitable stopper means.

Each friction member 2 consists of two clamping jaws 2', 2". One 2' of these is secured to the plate 1, and the other jaw 2" is urged towards the first one 2' by springs 5. Inside the friction members are two brake liners 3 being urged towards the pipe 4 by springs 5 and screw 6. The screws are tightened towards the distance pipe 7 with a certain force, and the spring force is adjusted to yield the necessary buffer force by the aid of interposed layers 8. In this manner the desired buffer force can be achieved with a constant tightening moment of the screws 6 and it is avoided that the buffer force changes after a possible demounting or readjustment of the buffer.

I claim:

1. A buffer arrangement for absorbing and by friction retarding the live force of a linearly moving body comprising one or more friction members provided with mounting means to be secured to said body, each of said friction members comprising an inner clamping jaw and an outer clamping jaw, spring means urging said jaws towards one another, adjustment means adjusting the spring force of said spring means, each of said jaws being shaped in a manner that forms an opening therebetween adapted for the passage of an elongated cylindrical element, one or both ends of which are arranged to contact and retard said force, a brake lining within said opening, said adjustment means comprising screws passing through one of said clamping jaws and into the other clamping jaw, a distance pipe placed around each of said screws against which pipes the corresponding screws are tightened and interposed layers between the spring means and the outer clamping jaw to adjust said spring force and provide the desired buffer force.

2. A buffer arrangement according to claim 1, wherein the cylindrical element consists of a cylindrical pipe one or both ends of which are provided with a rubber stopper.

* * * * *